(No Model.)

F. W. KIRKBRIDE.
CULTIVATOR.

No. 401,178. Patented Apr. 9, 1889.

ON LINE X---X

Witnesses.

Inventor
F. W. Kirkbride
By Phil. T. Dodge
Attorney

UNITED STATES PATENT OFFICE.

FRANK WILSON KIRKBRIDE, OF STRATTON, NEBRASKA.

CULTIVATOR.

SPECIFICATION forming part of Letters Patent No. 401,178, dated April 9, 1889.

Application filed August 28, 1888. Serial No. 283,930. (No model.)

*To all whom it may concern:*

Be it known that I, FRANK WILSON KIRKBRIDE, of Stratton, in the county of Hitchcock and State of Nebraska, have invented certain Improvements in Cultivators, of which the following is a specification.

My invention relates to an implement intended more particularly for the cultivation of what is known as "listed" corn—that is, corn planted in the bottom of a trench or furrow.

My machine consists, essentially, of a frame provided with supporting-runners, longitudinal blades to enter the soil and prevent lateral motion, and oblique blades or scrapers of great length adapted to destroy the weeds and to properly direct the surface soil inward or outward, as required.

The invention consists in various features of construction relating to the main frame, the reversible or adjustable blades, and other parts, as hereinafter recited in detail.

Figure 1:
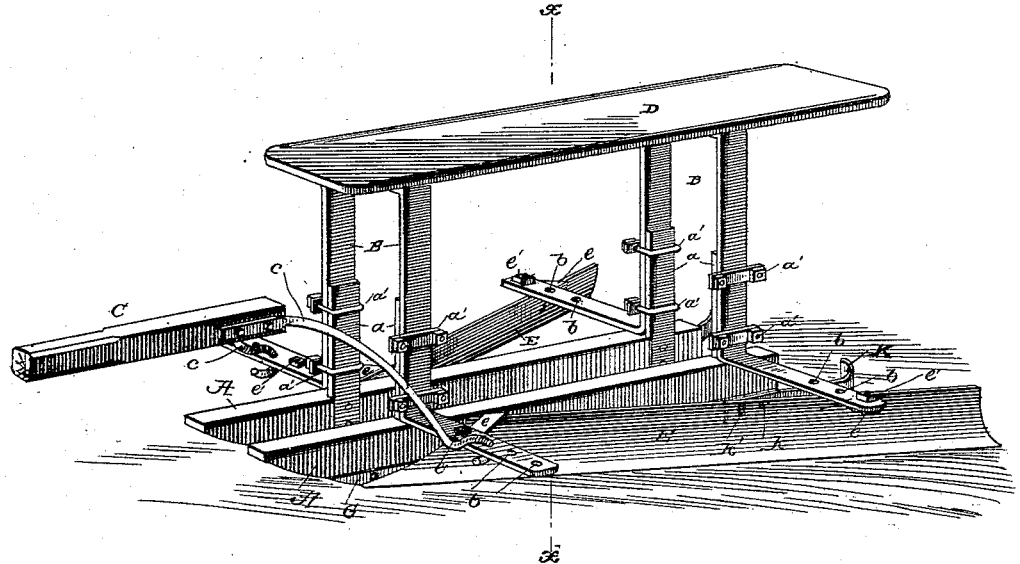
Figure 2:
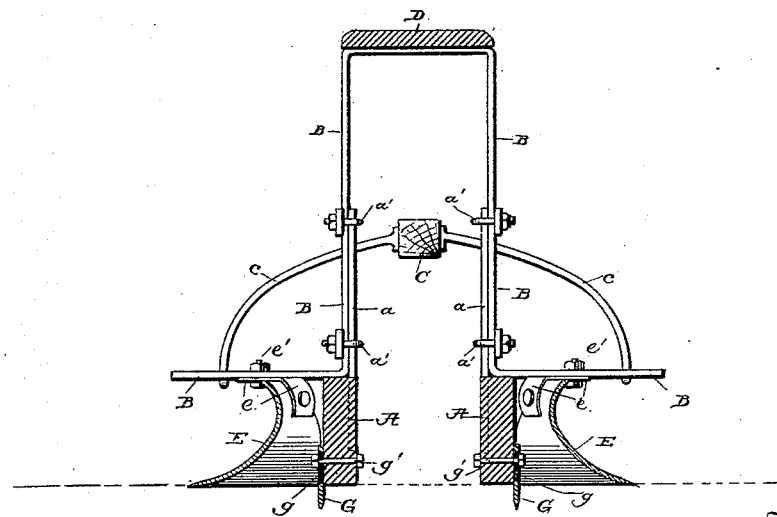

In the accompanying drawings, Figure 1 is a perspective view of my machine. Fig. 2 is a vertical cross-section of the same on the line $x\ x$.

Referring to the drawings, A A represent two parallel runners located at a sufficient distance apart to admit of their passing on opposite sides of the growing plants. Each of these runners is provided near opposite ends with two rigid upright arms, $a\ a$, which are secured by clip-bolts $a'$ or equivalent fastening devices to connecting-bars B. There are two of these bars, one at each end of the machine, each of an arched form, or, in other words, of a ∩ form, with their lower ends turned outward in opposite directions and provided each with a series of vertical perforations, $b$.

A draft pole or tongue, C, is provided at the rear end with divergent arms $c$, which are hooked through the outreaching arms of the front bar B. A long plank, D, serving as a seat for the driver, is bolted to the elevated portion of the bars B B. It assists in giving rigidity to the structure, while at the same time it admits of the driver shifting his position forward or backward, in order that his weight may be applied in the front or rear end of the machine, according to the depth to which the soil is to be cultivated, the character of the soil, and other controlling circumstances.

E E are two divergent blades, runners, or scrapers, formed of sheet-steel or other equivalent material, and usually of a length of four feet, (more or less.) These blades are curved in cross-section and brought to a sharp cutting-edge at the lower side. Each blade is provided near opposite ends with ears $e$, extending horizontally from the upper edge to receive vertical fastening-bolts $e'$, by which they are firmly attached to the outreaching ends of the cross-bars B. When the soil is to be thrown away from the plants, the blades or scrapers are arranged, as shown in Fig. 1, with their forward ends near the runners and their rear ends diverging therefrom. The angle of divergence may be varied at will by changing the bolts $e'$ to the different holes. When the soil is to be thrown inward toward the plants, the two blades are transposed, so as to present their cutting-edges inward, and so, also, that they converge toward the rear ends, as plainly indicated by the dotted lines in Fig. 1. This adaptability of the blades for transposal that they may act with an outward or with an inward cutting action, as required, is an important feature of my machine. The runners travel on the surface of the ground and control the depth to which the blades or scrapers pass below the surface. The clip-bolts $a'$ admit of the runners being raised and lowered in relation to the cross-bars and cutters to vary the depth of cultivation.

In order to prevent the machine from shifting laterally out of position in consequence of the unequal resistance which is from time to time offered to the cutting blades or scrapers, I provide the runners $a$ with longitudinal blades or cutters G, which, entering the soil, afford a strong resistance to the lateral movement of the machine. These blades are provided, as shown, with vertical slots $g$, and secured to the runners by bolts $g'$, passing therethrough. This permits their adjustment to compensate for wear or for other purposes.

In order to protect the young plants from clods which might otherwise roll inward thereon, I provide each runner at the rear end with an inwardly-curved arm, K, secured thereto by a pivot, $k$, and a bolt, $k'$, passing through a vertical slot, in order that the rear end of the arms may be raised or lowered in relation to the runner, as required. When the machine is operated to throw the soil toward the plants, these arms are removed or turned upward out of action.

Having thus described my invention, what I claim is—

1. In a cultivator, the two runners and the long divergent blades or scrapers located outside of the respective runners, in combination with the blades G, secured to and extending below the runners to prevent lateral movement of the machine.

2. In a cultivator, the arched cross-bars B, having the outwardly-turned ends, the runners secured to said bars and adjustable vertically in relation thereto, and the oblique scrapers secured to the ends of the cross-bars, as shown.

3. The arched cross-bars with the outwardly-turned ends and the oblique scrapers rigidly attached thereto, in combination with the two runners having the upright arms, the clip-bolts securing said arms to the cross-bars, and the blades G, secured to and adjustable vertically upon the runners.

4. In a cultivator, the two runners, the arched cross-bars connecting said runners and extended upward at their ends, and the oblique blades or scrapers bolted to said extended ends and adapted for transposition, as described, whereby they may be caused to throw the earth inward or outward, as occasion may require.

In testimony whereof I hereunto set my hand, this 11th day of August, 1888, in the presence of two attesting witnesses.

FRANK WILSON KIRKBRIDE.

Witnesses:
MILTON W. NESMITH,
S. P. KIRKBRIDE.